Aug. 9, 1960     R. J. WENTSEL     2,948,064
BUTTER RULER
Filed Aug. 13, 1958
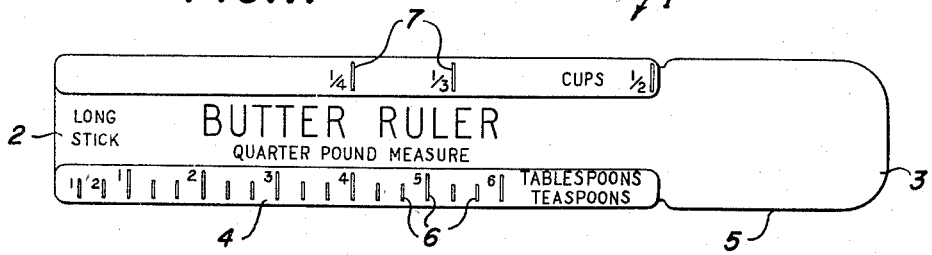
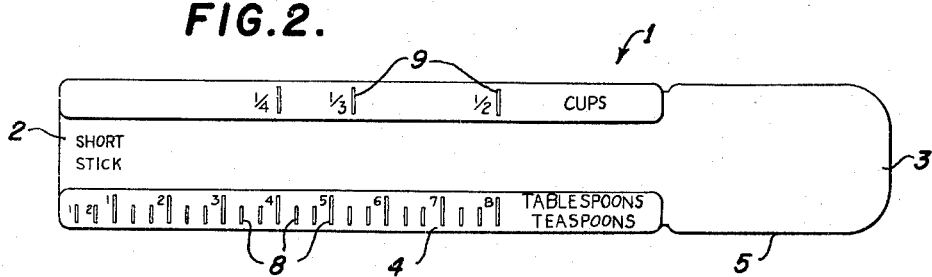
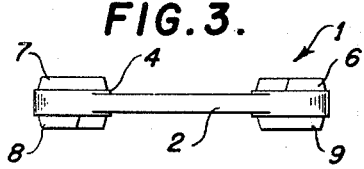 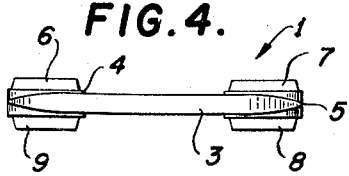
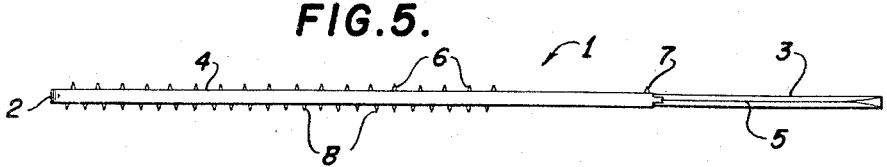
INVENTOR.
ROBERT J. WENTSEL
BY
*Attorneys*

United States Patent Office 2,948,064
Patented Aug. 9, 1960

2,948,064

BUTTER RULER

Robert J. Wentsel, 837 Lake Ave., Racine, Wis.

Filed Aug. 13, 1958, Ser. No. 754,870

2 Claims. (Cl. 31—15)

This invention relates to a butter ruler for measuring desired quantities of butter as in a home kitchen and for cutting the same from the regular quarter pound sticks of butter.

Measuring devices for butter heretofore employed have been constructed of metal strips which either bear recessed marks or are slotted at one edge at predetermined distances corresponding to desired measurements and which slots are adapted to receive a knife edge for marking the butter at selected slots. Such strips are susceptible to ready bending out of shape and are not easy to employ.

The present invention provides a butter ruler of highly resilient flexible synthetic plastic material of a length longer than the regular quarter pound stick of butter, with a rule extending for the full length of the stick and a butter cutting edge on the remainder of the length of the ruler. The markings on the rule are raised so that they can be impressed upon the surface of a butter stick so that upon removal of the rule, the cutting edge can be used to cut any selected accurate quantity of butter from the stick.

The butter ruler embodying the invention is illustrated in the accompanying drawing in which:

Figure 1 is a plan view of one side of the butter ruler;

Fig. 2 is a similar view of the other side of the butter ruler;

Fig. 3 is an enlarged end elevational view of the ruler taken from the rule end;

Fig. 4 is an enlarged end elevational view of the ruler taken from the cutting end; and Fig. 5 is an edge elevational view of the ruler.

The butter ruler is a molded strip of non-toxic flexible synthetic plastic material such as high impact polystyrene. The body 1 of the ruler is substantially longer than the length of a regular quarter pound long stick of butter to provide a rule portion 2 at one end of a length corresponding to the stick and a knife portion 3, at the other end of a length greater than the width or thickness of the butter stick. The width of the ruler generally corresponds to the width or thickness of the regular square butter stick.

The body 1 is relatively thin to provide a desired resilient flexibility of the ruler. The edge portions 4 extending longitudinally of the rule portion 2 are raised on both sides to provide greater thickness for the edges and reinforce the same against damage.

The knife portion 3 is beveled from both sides at each edge to provide a dull knife edge 5 for cutting butter when utilizing the rule portion 2 as a handle.

There are two different regular quarter pound butter sticks on the market, one known as the long stick and the other known as the short stick. The butter ruler of the present invention therefore has the desired measurement markings on one side for the long stick as indicated in Fig. 1, and the desired measurement markings on the other side for the short stick as indicated in Fig. 2.

Referring to Fig. 1, the term "long stick" is raised at the rule end in the central body 1 to indicate that that side of the ruler is to be used for measuring long sticks of butter. The opposite side of the ruler has the term "short stick" raised from the central body 1 as indicated in Fig. 2 to be used for measuring short sticks of butter.

Again referring to Fig. 1 the raised marks 6 at one edge are eighteen in number and are spaced to correspond with teaspoons of butter when the long stick is sliced at the positions of the marks. Every third mark 6 at this edge is longer than the other marks to indicate that the butter sliced from the long stick at these longer marks provide separate tablespoons in amount. These marks 6 may be numbered as indicated, if desired. The terms "teaspoons" and "tablespoons" are also raised from the corresponding raised edge portion 4 to designate the marks 6, as indicated.

At the opposite edge of the face of the ruler shown in Fig. 1 three raised marks 7 extending transversely of the raised edge portion 4 are spaced longitudinally to accurately measure from the end of the ruler the quantities of ¼ cup, ⅓ cup and ½ cup, respectively. The term "cups" is also raised on this portion of the ruler to designate the measurement.

The marks 8 and 9 on the oppossite face of the ruler as shown in Fig. 2 for the short stick are similar to marks 6 and 7 just described, but are more closely spaced to provide an accurate measurement for slicing butter from the short stick.

In using the rule to measure a desired quantity of butter to be sheared from the stick the knife portion 3 may constitute a handle while the rule portion 2 is laid on the face of the stick of butter and pressed into the butter to effect marking of the same by the raised marks 6 and 7 or 8 and 9, as the case may be. Thereafter, the ruler is removed and the rule portion 2 is used as a handle while one of the cutting edges 5 of the knife portion 3 is applied to slice a desired measured quantity of butter from the stick as indicated by the impression from the corresponding raised mark.

The invention provides a lightweight low cost butter ruler having raised marks thereon that do not wash off and that can be easily cleaned after use.

Various modifications of the embodiment may be employed within the scope of the invention as set forth in the accompanying claims.

I claim:

1. A butter ruler and cutter comprising a molded thin flat strip of synthetic material having a width corresponding to the width of one side of a regular quarter pound stick of butter and a total length substantially greater than said stick, said strip having a body portion corresponding in length generally to the length of a regular quarter pound stick of butter and having a blade portion at one end thereof continuing the same thickness as said body portion and with its opposite side edges tapered to provide for cutting and spreading of butter while said body portion is utilized as a handle, the longitudinal edge portions of said body portion being substantially thicker than the body and blade portions of said strip to strengthen the same and provide necessary stiffness, one raised edge portion on each side of the strip having raised transverse markings spaced to measure and mark the butter stick in terms of a one-half cup and fractions thereof, the other raised edge portion on each side of the strip having raised transverse markings spaced to measure and mark the butter stick in terms of both tablespoons and teaspoons, the markings on one side of said strip being for a long stick of butter and those on the opposite side of said strip being for a short stick of butter, and the body portion of said strip intermediate said raised edge portions having markings on opposite sides of the strip indicative of long and short stick application for the corresponding measurement markings.

2. A butter ruler and cutter comprising a molded thin flat strip of synthetic material having a width corresponding to the width of one side of a regular quarter pound stick of butter and a total length substantially greater than said stick, said strip having a body portion corresponding in length generally to the length of a regular quarter pound stick of butter and having a blade portion at one end thereof continuing the same thickness as said body portion and with its opposite side edges tapered to provide for cutting and spreading of butter while said body portion is utilized as a handle, the longitudinal edge portions of said body portion being substantially thicker than the body and blade portions of said strip to strengthen the same and provide necessary stiffness.

References Cited in the file of this patent
UNITED STATES PATENTS

| | | |
|---|---|---|
| D. 140,049 | Davis | Jan. 16, 1945 |
| D. 140,818 | Klinkelhofer | Apr. 10, 1945 |
| 1,809,165 | Hart | June 9, 1931 |
| 1,952,698 | Willem | Mar. 27, 1934 |
| 2,339,773 | Egan | Jan. 25, 1944 |